US010135652B2

United States Patent
Rong et al.

(10) Patent No.: US 10,135,652 B2
(45) Date of Patent: Nov. 20, 2018

(54) SYSTEM AND METHOD FOR SETTING CYCLIC PREFIX LENGTH

(71) Applicant: Futurewei Technologies, Inc., Plano, TX (US)

(72) Inventors: Zhigang Rong, San Diego, CA (US); Yunsong Yang, San Diego, CA (US); Young Hoon Kwon, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/521,365

(22) Filed: Oct. 22, 2014

(65) Prior Publication Data

US 2015/0117363 A1    Apr. 30, 2015

Related U.S. Application Data (60) Provisional application No. 61/895,217, filed on Oct. 24, 2013.

(51) Int. Cl.
*H04L 27/26* (2006.01)
*H04B 7/0452* (2017.01)
(Continued)

(52) U.S. Cl.
CPC ....... *H04L 27/2607* (2013.01); *H04B 7/0452* (2013.01); *H04B 7/068* (2013.01);
(Continued)

(58) Field of Classification Search
CPC ..... H04W 72/04; H04W 88/08; H04W 76/00; H04W 72/0413; H04W 26/06; H04W 28/18; H04W 72/1289; H04L 5/003; H04L 29/0653; H04L 2012/5652; H04L 1/0028; H04L 1/0079; H04L 1/0083;
(Continued)

(56) References Cited

U.S. PATENT DOCUMENTS 8,422,577 B1   4/2013  Shetty et al.
8,565,082 B1 * 10/2013  Vargantwar ......... H04L 27/2607
                                                  370/230

(Continued)

FOREIGN PATENT DOCUMENTS

CN    101640579 A    2/2010
CN    101790202 A    7/2010

(Continued)

OTHER PUBLICATIONS

3GPP TSG-RAN WG1 #71 R1-124853, "Remaining details on EPDCCH in MBSFN subframes," NEC Group, New Orleans, LA, US, Nov. 12-16, 2012, total 3 pages.

(Continued)

*Primary Examiner* — Brenda H Pham
(74) *Attorney, Agent, or Firm* — Jinghua Karen Tang (57) ABSTRACT

A method for communicating in a wireless communications system includes receiving scheduling information including information for an uplink transmission scheduled for the station, and determining a first length of a first cyclic prefix for a transmission in accordance with the scheduling information. The method also includes transmitting the transmission with the first cyclic prefix.

4 Claims, 9 Drawing Sheets

(51) Int. Cl.
*H04L 5/00* (2006.01)
*H04W 72/04* (2009.01)
*H04W 28/18* (2009.01)
*H04B 7/06* (2006.01)
*H04W 28/06* (2009.01)
*H04W 72/12* (2009.01)

(52) U.S. Cl.
CPC .......... *H04L 5/0023* (2013.01); *H04L 5/0091* (2013.01); *H04W 28/18* (2013.01); *H04W 72/0413* (2013.01); *H04W 28/06* (2013.01); *H04W 72/1289* (2013.01)

(58) Field of Classification Search
CPC . H04L 1/0084; H04L 1/0085; H04L 27/2607; H04L 5/0023; H04L 5/0091; H04J 3/076; H04B 7/0452; H04B 7/068
USPC ....... 370/329, 431, 471, 473, 476, 505, 506, 370/508
See application file for complete search history.

(56) References Cited

U.S. PATENT DOCUMENTS

| | | | |
|---|---|---|---|
| 8,705,420 B2 | 4/2014 | Abeta et al. | |
| 9,184,968 B2 | 11/2015 | Dimou et al. | |
| 9,510,311 B2* | 11/2016 | Li | H04J 11/00 |
| 2006/0176966 A1* | 8/2006 | Stewart | H04L 27/2607 |
| | | | 375/260 |
| 2008/0084845 A1* | 4/2008 | Kuchibhotla | H04B 7/2656 |
| | | | 370/331 |
| 2009/0125363 A1 | 5/2009 | Frederiksen et al. | |
| 2010/0329236 A1 | 12/2010 | Sampath et al. | |
| 2011/0110323 A1 | 5/2011 | Kim et al. | |
| 2011/0267996 A1 | 11/2011 | Guan et al. | |
| 2012/0008574 A1 | 1/2012 | Xiao et al. | |
| 2012/0170524 A1* | 7/2012 | Ren | H04L 1/1692 |
| | | | 370/329 |
| 2012/0270535 A1 | 10/2012 | Chen et al. | |
| 2012/0281551 A1 | 11/2012 | Alanaerae | |
| 2013/0022090 A1* | 1/2013 | Weng | H04L 25/03343 |
| | | | 375/219 |
| 2013/0128765 A1 | 5/2013 | Yang et al. | |
| 2013/0272435 A1 | 10/2013 | Shellhammer | |
| 2013/0272436 A1 | 10/2013 | Makhlouf et al. | |
| 2013/0308563 A1 | 11/2013 | Xiao et al. | |
| 2013/0315321 A1 | 11/2013 | Rajagopal et al. | |
| 2015/0117363 A1 | 4/2015 | Rong et al. | |
| 2016/0105304 A1 | 4/2016 | Kwon et al. | |
| 2016/0105863 A1 | 4/2016 | Li et al. | |

FOREIGN PATENT DOCUMENTS

| | | |
|---|---|---|
| CN | 102695264 A | 9/2012 |
| JP | 2012531829 A | 12/2012 |
| KR | 10-2010-0129315 A | 12/2010 |
| WO | 2009/072171 A1 | 6/2009 |
| WO | 2012090028 A1 | 7/2012 |
| WO | 2013010247 A1 | 1/2013 |

OTHER PUBLICATIONS

Cariou, L., et al., "High-efficiency WLAN," IEEE 802.11-13/0331r5, Mar. 19, 2013, total 21 pages.

Cariou, L., et al, "High-efficiency WLAN Straw poll," IEEE 802.11-13/0339r10, Mar. 19, 2013, total 7 pages.

R1-084336, 3GPP TSG RAN WG1#55, "Analysis on uplink/downlink time delay issue for distributed antenna system", Huawei, CMCC, RITT, CATT, Prague, Czech Republic, Nov. 10-14, 2008, total 8 pages.

* cited by examiner

SYSTEM AND METHOD FOR SETTING CYCLIC PREFIX LENGTH

This application claims the benefit of U.S. Provisional Application No. 61/895,217, filed on Oct. 24, 2013, entitled "System and Method for Setting Cyclic Prefix Length," which application is hereby incorporated herein by reference.

TECHNICAL FIELD

The present invention relates to digital communications, and, in particular embodiments, to setting cyclic prefix length.

BACKGROUND

The number of devices using Wireless Local Area Networks (WLAN) continue to show dramatic growth. WLANs allow users the ability to connect to high-speed services without being tethered to wireline connections. WLANs are wireless communications systems that are based on the IEEE 802.11 series of technical standards. Typically, as the number of devices using WLANs increases, the density of devices in the WLANs (e.g., access points (APs) and stations (STA)) will also increase. High densities of APs (also commonly referred to as communications controller, controller, and the like) and stations (also commonly referred to as user, subscriber, terminal, and the like) tend to make WLANs less efficient, especially since the original WLANs were designed assuming a low density of APs and stations. As an example of inefficiency, a currently used enhanced distributed channel access (EDCA) based media access control (MAC) scheme generally does not work efficiently in an environment with high AP and station density.

A newly formed IEEE 802.11 Study Group named "High Efficiency WLAN (HEW)" has been formed to study, among other things, improving system performance in a high density environment.

SUMMARY OF THE DISCLOSURE

Example embodiments of the present disclosure which provide a system and method for setting cyclic prefix length.

In accordance with an example embodiment of the present disclosure, a method for communicating in a wireless communications system is provided. The method includes receiving, by a station, scheduling information including information for an uplink transmission scheduled for the station, and determining, by the station, a first length of a first cyclic prefix for a transmission in accordance with the scheduling information. The method also includes transmitting, by the station, the transmission with the first cyclic prefix.

In accordance with another example embodiment of the present disclosure, a method for communicating in a wireless communications system is provided. The method includes transmitting, by an access point, scheduling information to a station, wherein the scheduling information is configured to prompt an adjustment to a first length of a first cyclic prefix, and receiving, by the access point, a first transmission from the station, the first transmission with the first length of the first cyclic prefix determined in accordance with the scheduling information.

In accordance with another example embodiment of the present disclosure, a station is provided. The station includes a receiver, a processor operatively coupled to the receiver, and a transmitter operatively coupled to the processor. The receiver receives scheduling information including information for an uplink transmission scheduled for the station. The processor determines a first length of a first cyclic prefix for a transmission in accordance with the scheduling information. The transmitter transmits the transmission with the first cyclic prefix.

In accordance with another example embodiment of the present disclosure, an access point is provided. The access point includes a processor, a transmitter operatively coupled to the processor, and a receiver operatively coupled to the processor. The processor generates scheduling information. The transmitter transmits the scheduling information to a station, where the scheduling information prompts an adjustment to a first length of a first cyclic prefix. The receiver receives a transmission from the station, the transmission with the first length of the first cyclic prefix determined in accordance with the scheduling information.

One advantage of an embodiment is that the cyclic prefix length is set in accordance with implicit or explicit indicators without requiring timing advance commands, therefore, communications overhead is reduced.

A further advantage of an embodiment is that the cyclic prefix length is adjustable, therefore, when a long cyclic prefix is not needed, a short cyclic prefix is used, thereby reducing communications overhead.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to setting cyclic prefix length. For example, a station receives scheduling information including information for an uplink transmission scheduled for the station, and determines a first length of a first cyclic prefix for a transmission in accordance with the scheduling information. The station also transmits the transmission with the first cyclic prefix.

The present disclosure will be described with respect to example embodiments in a specific context, namely communications systems that uses different length cyclic prefixes to help maintain signal orthogonality. The disclosure may be applied to standards compliant communications systems, such as those that are compliant with Third Generation Partnership Project (3GPP), IEEE 802.11, and the like, technical standards, and non-standards compliant communications systems, that uses different length cyclic prefixes to help maintain signal orthogonality.

Figure 1:
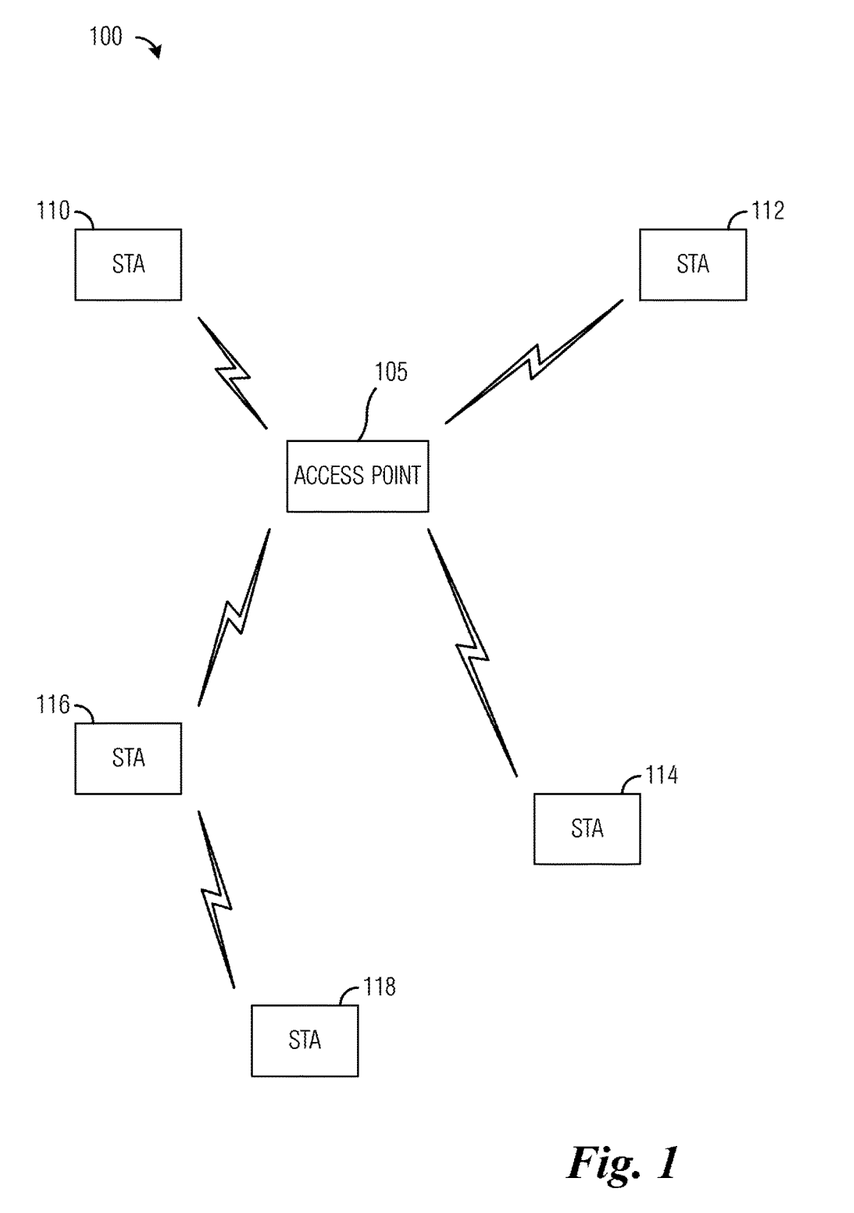
FIG. 1 illustrates wireless communications system in accordance with an embodiment.

FIG. 1 illustrates an example wireless communications system 100. Wireless communications system 100 includes an access point (AP) 105 that serves one or more stations, such as stations (STA) 110-116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118. While it is understood that communications systems may employ multiple APs capable of communicating with a number of stations, only one AP, and a number of stations are illustrated for simplicity.

Transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
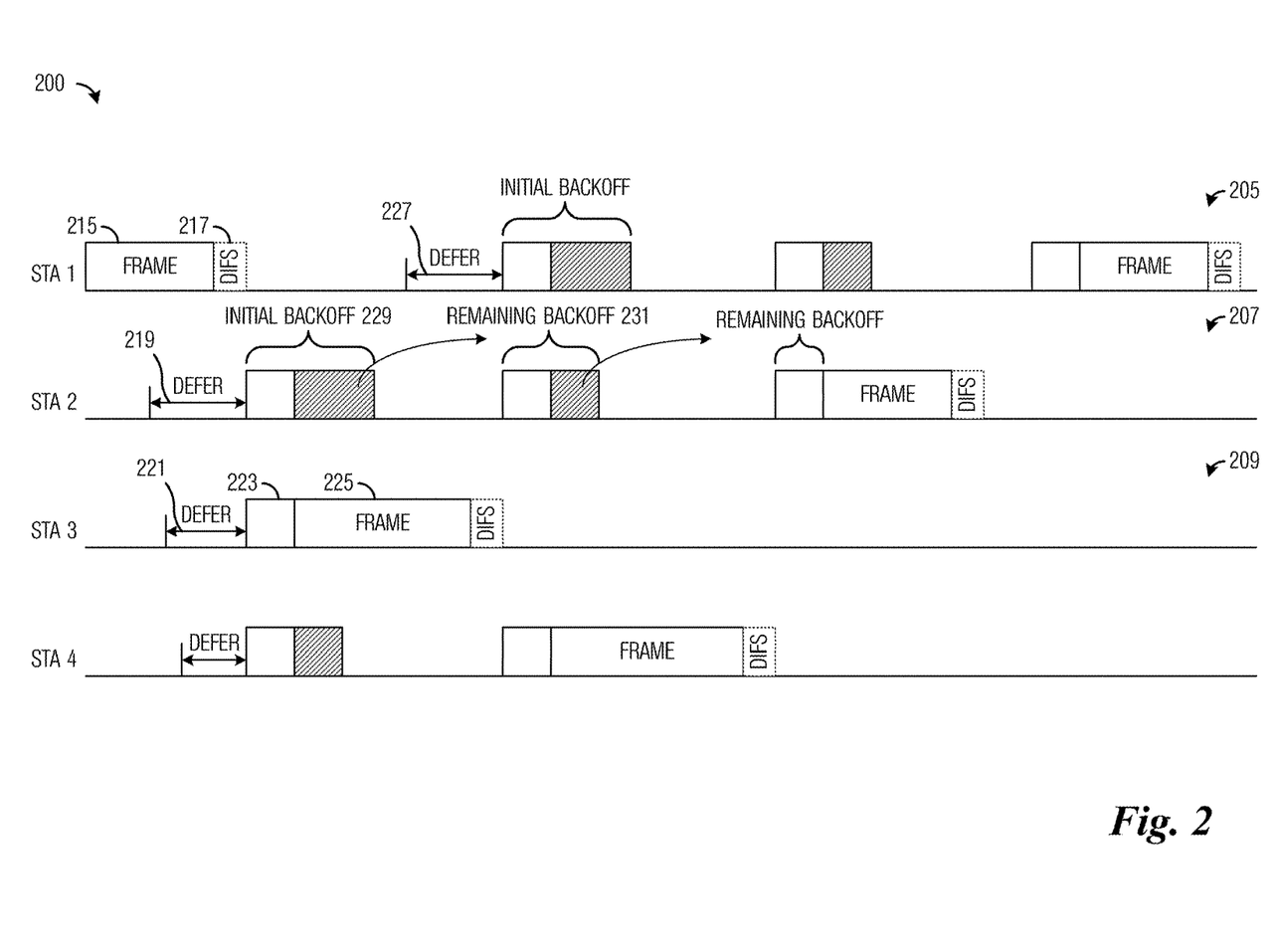
FIG. 2 illustrates a diagram of channel access timing in accordance with an embodiment.

FIG. 2 illustrates a diagram 200 of example channel access timing. A first trace 205 represents channel access for a first station (STA 1), a second trace 207 represents channel access for a second station (STA 2), and a third trace 209 represents channel access for a third station (STA 3). A short inter-frame space (SIFS) has a duration of 16 microseconds, a point coordination function (PCF) inter-frame space (PIFS) has a duration of 25 microseconds, while a DIFS may last longer than either the SIFS or the PIFS. A backoff period may be a random duration. Therefore, active scanning may not provide the best solution when there are large numbers of stations attempting to perform AP/network discovery.

In cellular communications systems, e.g., 3GPP LTE compliant communications systems, orthogonal frequency division multiple access (OFDMA) has been shown to be able to provide robust performance in high density environments. OFDMA has the ability to support multiple users simultaneously by carrying traffic from different users on different portions of the communications system bandwidth. In general, OFDMA can support a large number of users more efficiently, especially when data traffic from individual users is low. Specifically, OFDMA can avoid wasting frequency resources if traffic from one user cannot fill the entirety of the communications system bandwidth by utilizing the unused bandwidth to carry transmissions from other user(s). The ability to utilize unused bandwidth may become crucial as the communications system bandwidth continues to become wider.

Similarly, uplink multi-user multiple input multiple output (UL MU-MIMO) techniques have also been used in cellular communications systems, e.g., 3GPP LTE, to enhance communications system performance. UL MU-MIMO allows multiple users to simultaneously transmit on the same time-frequency resource(s) with the transmissions being separated in space (i.e., on different spatial streams).

In order to support OFDMA and/or UL MU-MIMO, it is generally required that the transmitted signals of the multiple users (stations) arrive at the receiver (AP) at substantially the same time, otherwise, orthogonality among the signals from the multiple users may be destroyed. For downlink transmissions, this is readily achieved since the downlink transmissions are from a single AP (or from multiple APs that can easily be coordinated). For uplink transmissions, this typically becomes more difficult since the transmissions are from multiple users and the multiple users may be operating independently, making coordination difficult.

In 3GPP LTE compliant communications systems, uplink synchronization is achieved through an evolved NodeB (eNB) sending timing advance commands to user equipments (UE). eNBs are also commonly referred to as NodeBs, APs, base stations, controllers, communications controllers, and the like. UEs are also commonly referred to as stations, users, subscribers, mobile stations, mobiles, terminals, and the like.

The timing advance value controls the timing offset of a UE's transmission on the uplink. For UEs that are closer to the eNB (hence with shorter propagation delay), a smaller timing advance value may be used. For UEs that are farther away from the eNB (hence with greater propagation delay), a larger timing advance value may be used. By controlling the uplink transmission timing for different UEs, the eNB can make sure that the arrival time of signals originating from multiple UEs are aligned.

However, in a high density environment, sending timing advance commands to a large number of stations may not be feasible. Additionally, IEEE 802.11 compliant communications systems are asynchronous in nature, it is difficult for an AP to estimate the required timing offset for each station due to factors such as the existence of a random backoff interval. Additionally, sending timing advance commands to a large number of stations may consume a considerable amount of resources in the communications system, leading to a large communications system overhead.

According to an example embodiment, an indicator of the use of OFDMA and/or UL MU-MIMO in the uplink is used to inform stations that OFDMA and/or UL MU-MIMO is being used for uplink transmissions and to adjust their cyclic prefix (CP). As an illustrative example, a station receives uplink scheduling information from its AP. The uplink scheduling information may include an indicator of the use of OFDMA and/or UL MU-MIMO. The indicator may be set to a first value (e.g., TRUE or ON) to indicate that OFDMA and/or UL MU-MIMO is being used for this uplink transmission, and the indicator may be set to a second value (e.g., FALSE or OFF) to indicate that OFDMA and/or UL MU-MIMO is not being used for this uplink transmission. In other words, if the indicator is set to the first value, then multiple stations may be transmitting simultaneously on the uplink. The scheduling information may be transmitted from the AP to the station with a CP length of $CP_{DL}$ (CP length value for the downlink). The indicator may be an explicit indicator, meaning that it is present in the uplink scheduling information and the station receiving the uplink scheduling information may readily determine the value of the indicator included in the uplink scheduling information. The indicator may be an implicit indicator, meaning that the station receiving the scheduling information may infer the value of the indicator by examining the uplink scheduling information intended for the station and/or uplink scheduling information intended for other stations.

At the station, as the station receives the uplink scheduling information, the station may decide on the CP length value for the uplink ($CP_{UL}$) that it will use in its uplink transmission as informed by the uplink scheduling information. If the uplink scheduling information includes the indicator set to the second value (i.e., OFDMA and/or UL MU-MIMO is not being used) the station may set its $CP_{UL}$, to a first CP length value (CP1), while if the indicator is set to the first value (i.e., OFDMA and/or UL MU-MIMO is being used) the station may set its $CP_{UL}$ to a second CP length value (CP2).

In general, CP1 may be the same value as $CP_{DL}$ and CP2 is larger than $CP_{DL}$ (and hence CP1) to help accommodate the different propagation delay between different stations and the AP when OFDMA and/or UL MU-MIMO is being used. It is noted that CP2 may be a default value specified by a technical standard, an operator of the communications system, and the like, and may not need to be signaled to the station. It is noted that other values for CP1 and CP2 are possible and that the described relationship of CP1<CP2 may not hold in all situations.

Figure 3A:
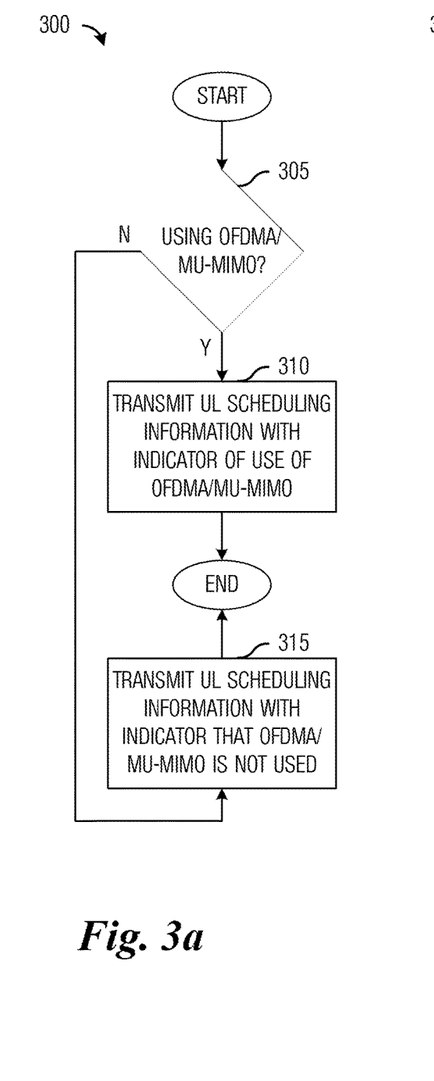
FIG. 3a illustrates a flow diagram of operations occurring in an AP as the AP transmits uplink scheduling information to stations in accordance with an embodiment.

FIG. 3a illustrates a flow diagram of example operations 300 occurring in an AP as the AP transmits uplink scheduling information to stations. The AP may perform a check to determine if it is using OFDMA and/or UL MU-MIMO for the uplink being scheduled (block 305). If it is, the AP may transmit the uplink scheduling information along with the indicator set to indicate that OFDMA and/or UL MU-MIMO is to be used for the scheduled uplink (block 310). If it is not, the AP may transmit the uplink scheduling information along with the indicator set to indicate that OFDMA and/or UL MU-MIMO is not to be used for the scheduled uplink (block 315).

Figure 3B:
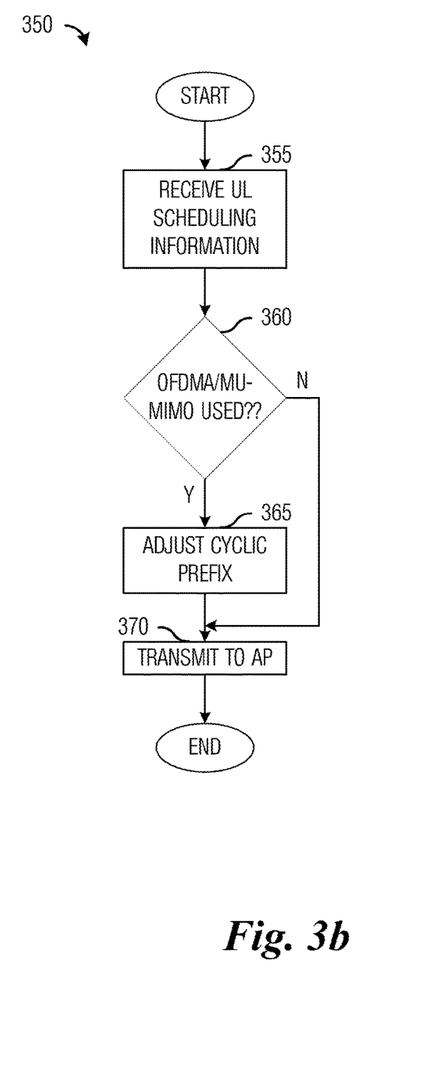
FIG. 3b illustrates a flow diagram of operations occurring in a station as the station transmits to its AP in accordance with an embodiment.

FIG. 3b illustrates a flow diagram of example operations 350 occurring in a station as the station transmits to its AP. The station may receive uplink scheduling information from its AP (block 355). The station may perform a check to determine if OFDMA and/or UL MU-MIMO is going to be used in the uplink (block 360). If OFDMA and/or UL MU-MIMO is going to be used in the uplink, i.e., the indicator is set to the first value (TRUE or ON), the station adjusts its cyclic prefix to the timing value CP2 (block 365) and transmits to the AP (block 370). If OFDMA and/or UL MU-MIMO is not going to be used in the uplink, i.e., the indicator is set to the second value (FALSE or OFF), the station does not adjust its cyclic prefix but keeps it at CP1 or $CP_{DL}$ and transmits to the AP (block 370).

In the SIFS after the end of the received uplink scheduling information, the station may start its uplink transmission with cyclic prefix length of $CP_{UL}$, on a resource as indicated in the uplink scheduling information. With the use of this example embodiment, a CP length value used in the uplink that is greater than the CP length value used in the downlink is employed when OFDMA and/or UL MU-MIMO is being used, which will help accommodate the different propagation delays between different stations and the AP. Therefore, the orthogonality between signals from the different stations is maintained at the receiver (e.g., the AP).

As an illustrative example, assuming the AP coverage is 100 meters, then the maximum round-trip propagation delay is about 0.67 us. With the guard interval (i.e., CP length) of 0.8 us in current 802.11 WiFi system, there is only 0.13 us (0.8–0.67 us) left for mitigating channel delay spread and station timing inaccuracy, which most likely will be inadequate. However, with a longer CP length value, for example, 1.6 us, for the UL when UL OFDMA and/or UL MU-MIMO is used, after deducting the maximum round-trip delay of 0.67 us, there still is about 0.93 us left for mitigating channel delay spread and STA timing inaccuracy, which most likely will be sufficient for most of the scenarios.

According to an example embodiment, low overhead associated with the use of shorter CPs is maintained when longer CPs are not needed. As an example, when OFDMA and/or UL MU-MIMO is not used, the longer CP is not necessary and a shorter CP may be employed, thus reducing the overhead arising from the CP. But when OFDMA and/or UL MU-MIMO is used, although a longer CP is employed, the additional overhead from longer CP will be compensated for due to the use of OFDMA and/or UL MU-MIMO. In fact, additional gain may be achieved due to the use of OFDMA and/or UL MU-MIMO (e.g., supporting transmissions from multiple stations).

Figure 4:
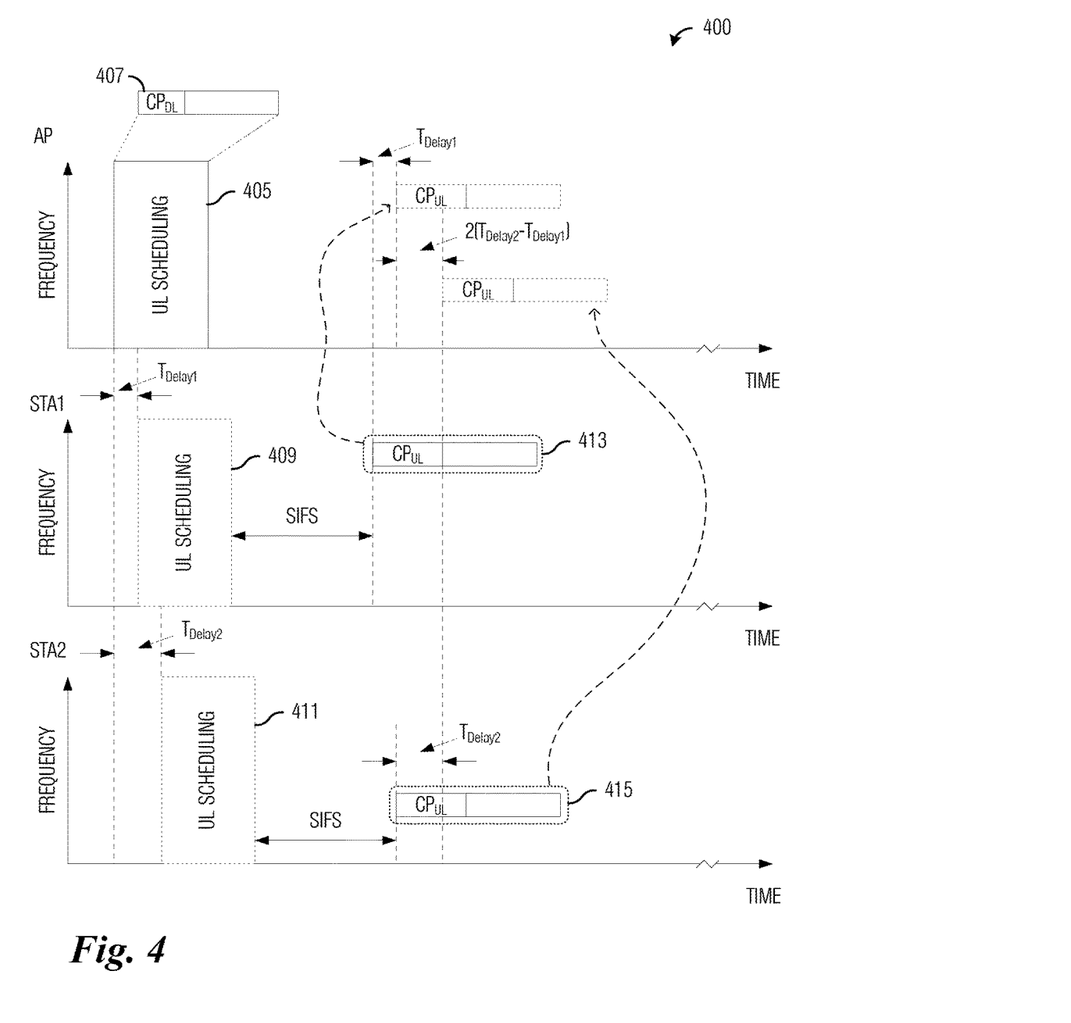
FIG. 4 illustrates an example interaction between an AP and two stations (STA1 and STA2) in accordance with an embodiment.

FIG. 4 illustrates an example interaction 400 between an AP and two stations (STA1 and STA2). It is noted that for simplicity reasons, on both the uplink and the downlink, only one OFDM symbol is shown. In reality, actual downlink and uplink transmissions may occur over a plurality of OFDM symbols. The AP transmits uplink scheduling information 405 to STA1 and STA2 on the downlink, with a CP length of $CP_{DL}$ 407. The uplink scheduling information includes the indicator that OFDMA is to be used on the scheduled uplink transmissions. Due to propagation delay, after $T_{Delay1}$, STA1 receives the uplink scheduling information (shown as uplink scheduling information 409). Similarly, after $T_{Delay2}$, STA2 receives the uplink scheduling information (shown as uplink scheduling information 411). In this example, the distance between STA2 and AP is larger than the distance between STA1 and AP, therefore, $T_{Delay2} > T_{Delay1}$. STA1 and STA2 check their uplink scheduling information, find their resource allocation information, and also find that OFDMA and/or UL MU-MIMO is to be used in the scheduled uplink transmission, so the stations set the CP length of UL transmission $CP_{UL}$ to CP2, which is larger than $CP_{DL}$. The use of OFDMA and/or UL MU-MIMO may be determined from an implicit indicator or an explicit indicator.

At a time SIFS after the end of their received uplink scheduling information, STA1 and STA2 transmit their uplink traffic on their allocated resource, respectively (uplink traffic 413 for STA1 and uplink traffic 415 for STA2), with a CP length of $CP_{UL}=CP2$, which is larger than $CP_{DL}$. Similarly, due to propagation delay, STA1 and STA2's uplink transmissions arrive at the AP after a delay of $T_{Delay1}$ and $T_{Delay2}$, respectively. Considering the round trip delay (e.g., from AP to station, and from station to AP), the difference of the arrival time of STA1 and STA2's uplink signal at AP receiver is $2*(T_{Delay2}-T_{Delay1})$. Since the CP length on the uplink is set to $CP_{UL}=CP_2$, which is larger than $2*(T_{Delay2}-T_{Delay1})$ with sufficient margin, the arrival time difference between STA1 and STA2 can be well accommodated by $CP_{UL}$, and the orthogonality between the uplink signals of STA1 and STA2 at the AP is maintained. The AP receives the uplink transmissions from STA1 and STA2 and performs additional operations accordingly.

Figure 5:
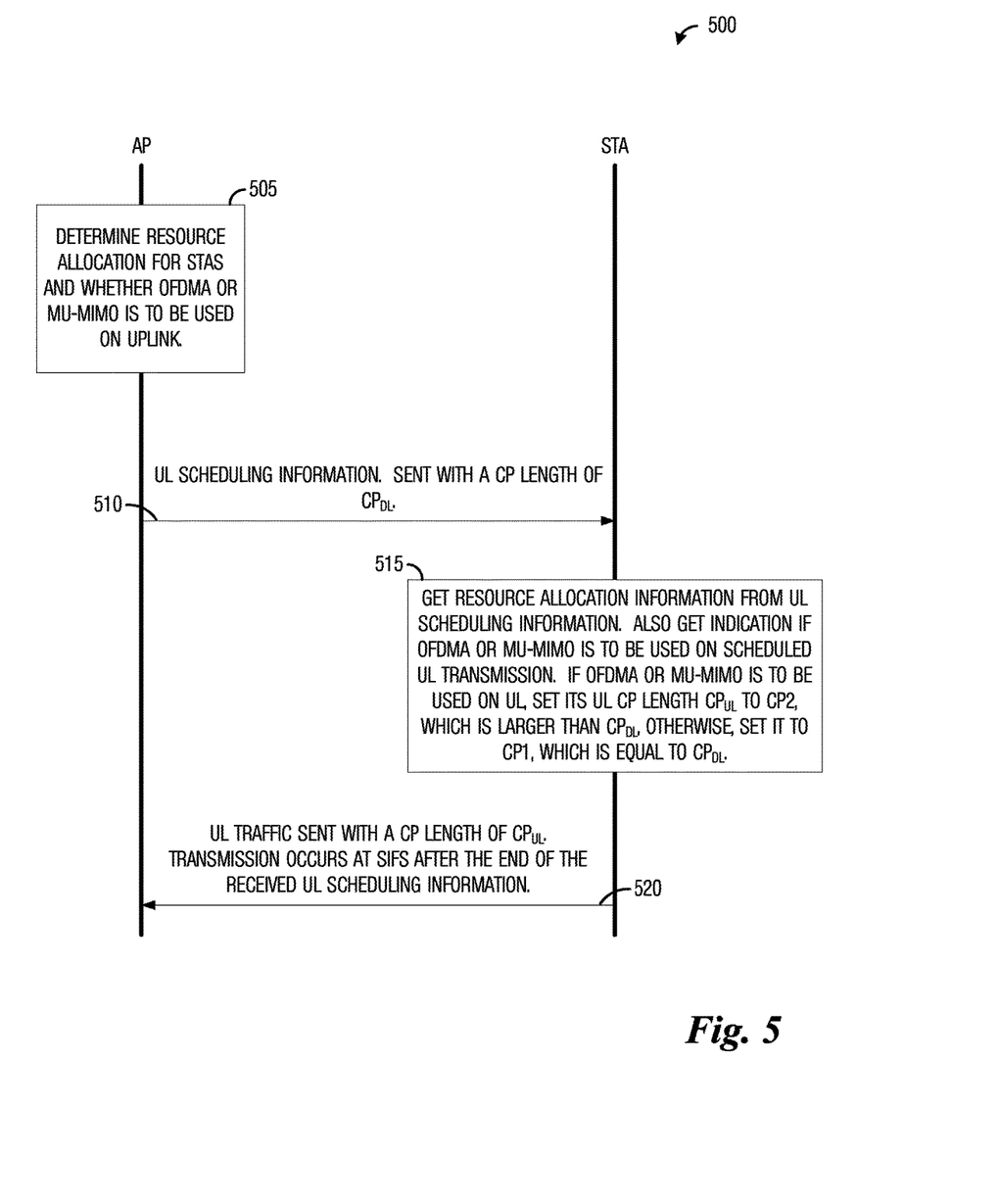
FIG. 5 illustrates a message exchange diagram highlighting messages exchanged between a station and its AP, where an indicator of the use of OFDMA and/or UL MU-MIMO is included in uplink scheduling information in accordance with an embodiment.

FIG. 5 illustrates a message exchange diagram 500 highlighting messages exchanged between a station and its AP, where an indicator of the use of OFDMA and/or UL MU-MIMO is included in uplink scheduling information.

The AP may determine resource allocations for stations, as well as determine if OFDMA and/or UL MU-MIMO is to be used by the stations in transmissions in the resource allocations (block 505). The AP may send UL scheduling information (shown as event 510). The UL scheduling information is sent with a CP length of $CP_{UL}$. The station receives the UL scheduling information. From the UL scheduling information, the station may be able to determine resource allocation information, as well as an indicator if OFDMA and/or UL MU-MIMO is being used in the UL transmission (block 515). If OFDMA and/or UL MU-MIMO is being used, the station may set $CP_{UL}=CP_2$, while if OFDMA and/or UL MU-MIMO is not being used, the station may set $CP_{UL}=CP_{DL}$. The station may send an UL transmission in a resource(s) allocated for it (shown as event 520). The UL transmission is sent with a CP length of $CP_{UL}$.

According to an example embodiment, to afford greater flexibility on setting the CP length for OFDMA and/or UL MU-MIMO transmission, the uplink scheduling information includes an indicator of the uplink CP length, instead of an indicator of whether OFDMA and/or UL MU-MIMO is to be used on the scheduled uplink transmission. The indicator of the uplink CP length can be in the form of a number of bits operating as an index pointing to a CP length value in a set of possible options. As an example, with two bit long indicator, a total of 4 possible CP lengths can be used for uplink transmissions.

Upon receiving the uplink scheduling information, the station determines the CP length $CP_{UL}$ to be used for its uplink transmission by checking the indicator of uplink CP length in the uplink scheduling information. More choices for uplink CP length will enable using different CP lengths in different scenarios, to better match differences in distance (or propagation delay) between different stations and the AP. As an example, in an outdoor environment with larger coverage areas, a larger CP length can be used, and in indoor environment with small coverage areas, a smaller CP length can be used, enabling reducing the overhead arising from the use of CPs.

Figure 6A:
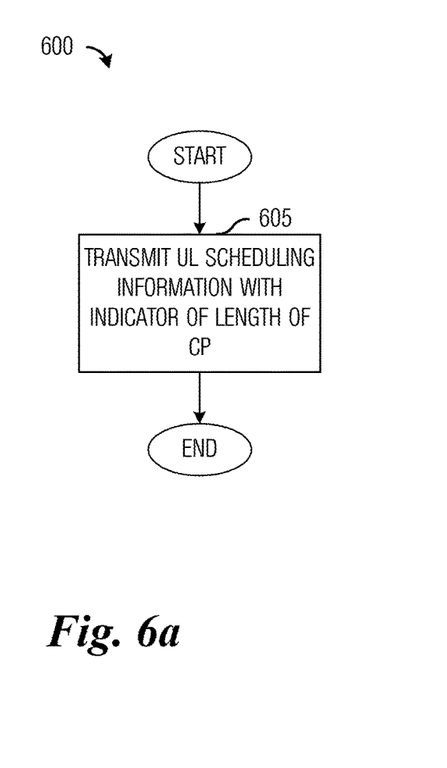
FIGS. 6a and 6b illustrate flow diagrams of operations occurring in an AP and a station as the AP transmits uplink scheduling information to the station with an indicator of CP length and the station transmits to the AP in an uplink, respectively in accordance with an embodiment.

FIG. 6a illustrates a flow diagram of example operations 600 occurring in an AP as the AP transmits UL scheduling information. Operations 600 may begin with the AP determining resource allocations for stations. The AP may transmit UL scheduling information, which includes an indicator of CP length (block 605).

Figure 6B:
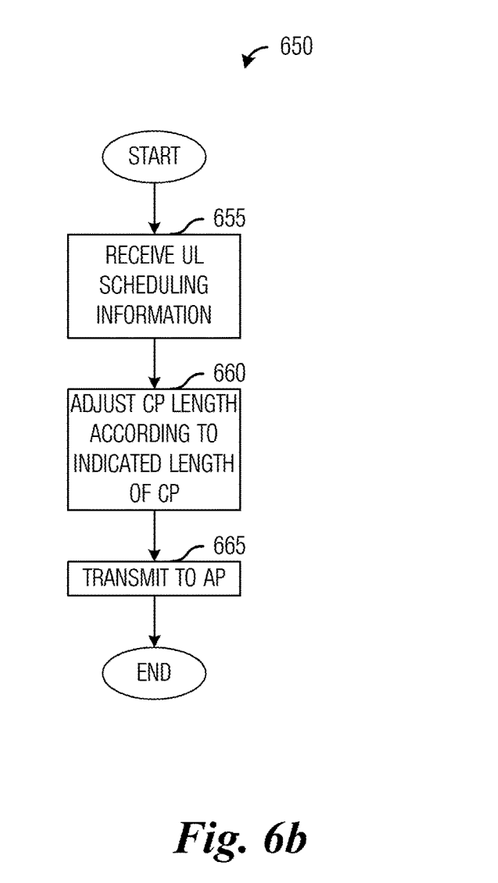

FIG. 6b illustrates a flow diagram of example operations 650 occurring in a station as the station transmits on an uplink. Operations 650 may begin with the station receiving UL scheduling information (block 655). The UL scheduling information may include information about a resource(s) scheduled for the station, as well as an indicator of CP length the station is to use for UL transmissions. As an illustrative example, the indicator may be an index to a plurality of different CP lengths and the station will use a CP length as indicated in its UL transmission. The station may set CP in accordance with the indicator of CP length (block 660). The station may make the UL transmission with CP value as indicated.

According to an example embodiment, it may be possible to eliminate the use of an indicator to indicate OFDMA and/or UL MU-MIMO usage or an indicator to indicate CP length altogether. Eliminating the indicator further reduces communications overhead. A station, upon receiving the uplink scheduling information, may check to determine if the uplink scheduling information is for more than one station. If the uplink scheduling information is for more than one station, the station may determine that OFDMA and/or UL MU-MIMO is being used for the uplink and set its uplink CP length ($CP_{UL}$) to CP2. If the uplink scheduling information is not for more than one station, the station may determine that OFDMA and/or UL MU-MIMO is not being used for the uplink and set its uplink CP length to CP1, where CP2>CP1.

It is noted that the station may need to check the uplink scheduling information for other stations in addition to its own in the received uplink scheduling information received from the AP.

Figure 7A:
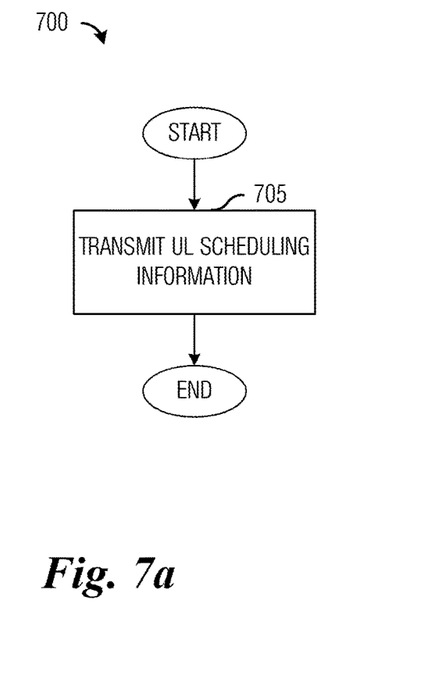
FIGS. 7a and 7b illustrate flow diagrams of operations occurring in an AP and a station as the AP transmits uplink scheduling information to the station and the station transmits to the AP in an uplink without the presence of an indicator of OFDMA and/or UL MU-MIMO or an indicator of CP length, respectively in accordance with an embodiment.

FIG. 7a illustrates a flow diagram of example operations 700 occurring in an AP as the AP transmits UL scheduling information without the presence of an indicator of OFDMA and/or UL MU-MIMO or an indicator of CP length. Operations 700 may begin with the AP determining resource allocations for stations. The AP may transmit UL scheduling information, which does not includes an indicator of OFDMA and/or UL MU-MIMO usage or CP length (block 705).

Figure 7B:
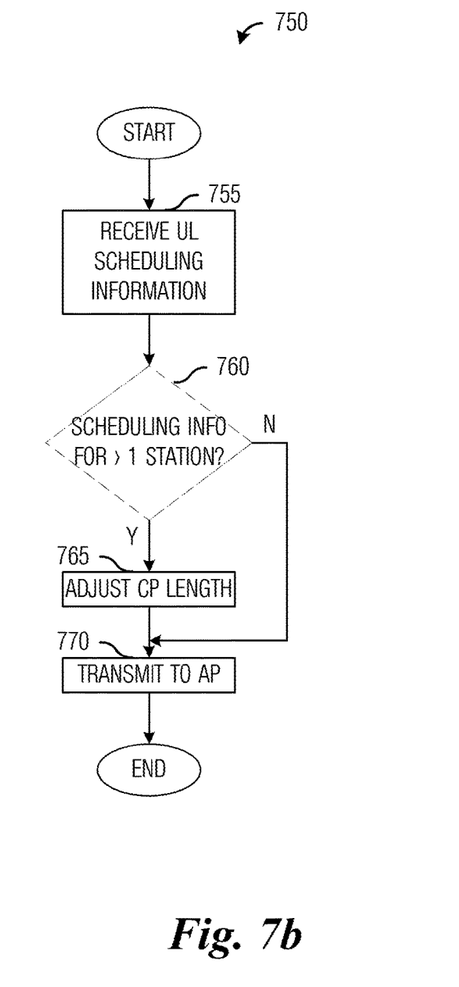

FIG. 7b illustrates a flow diagram of example operations occurring in a station as the station transmits on an uplink based on UL scheduling information that does not include an indicator of OFDMA and/or UL MU-MIMO or an indicator of CP length. Operations 750 may begin with the station receiving UL scheduling information (block 755). Since the UL scheduling information does not include an indicator of OFDMA and/or UL MU-MIMO usage or CP length, the station may perform a check to determine if the UL scheduling information contains scheduling information for more than 1 station (block 760). If the UL scheduling information contains scheduling information for more than 1 station, the station may adjust the $CP_{UL}$ for its UL transmission (block 765). If the UL scheduling information does not contain scheduling information for more than 1 station, the station may not adjust the $CP_{UL}$ for its UL transmission (given that it is set to a default value, CP1, for example). The station may transmit its UL transmission with the $CP_j$. (block 770). Alternatively, the station may adjust $CP_{UL}$ based on the UL scheduling information. As an illustrative example, if the UL scheduling information contains scheduling information for more than 1 station, the station may set $CP_{UL}$ to a first value and if the UL scheduling information does not contain scheduling information for more than 1 station, the station may set $CP_{UL}$ to a second value.

The example embodiments presented herein enable the use of OFDMA and/or UL MU-MIMO, making resource usage more efficient. A cyclic prefix for the uplink ($CP_{UL}$) is longer than the cyclic prefix for the downlink ($CP_{DL}$), which may help to accommodate different propagation delays between different stations and the AP, thereby maintaining the orthogonality among signals from the different stations at the AP. Adaptive cyclic prefix length also helps to maintain low overhead. When OFDMA and/or UL MU-MIMO are not used, longer cyclic prefixes are not necessary and a shorter cyclic prefix may be used, therefore reducing overhead. When OFDMA and/or UL MU-MIMO is used, longer cyclic prefixes are used, but the increased overhead may be compensated for by the additional gain achieved through the use of OFDMA and/or UL MU-MIMO.

Figure 8:
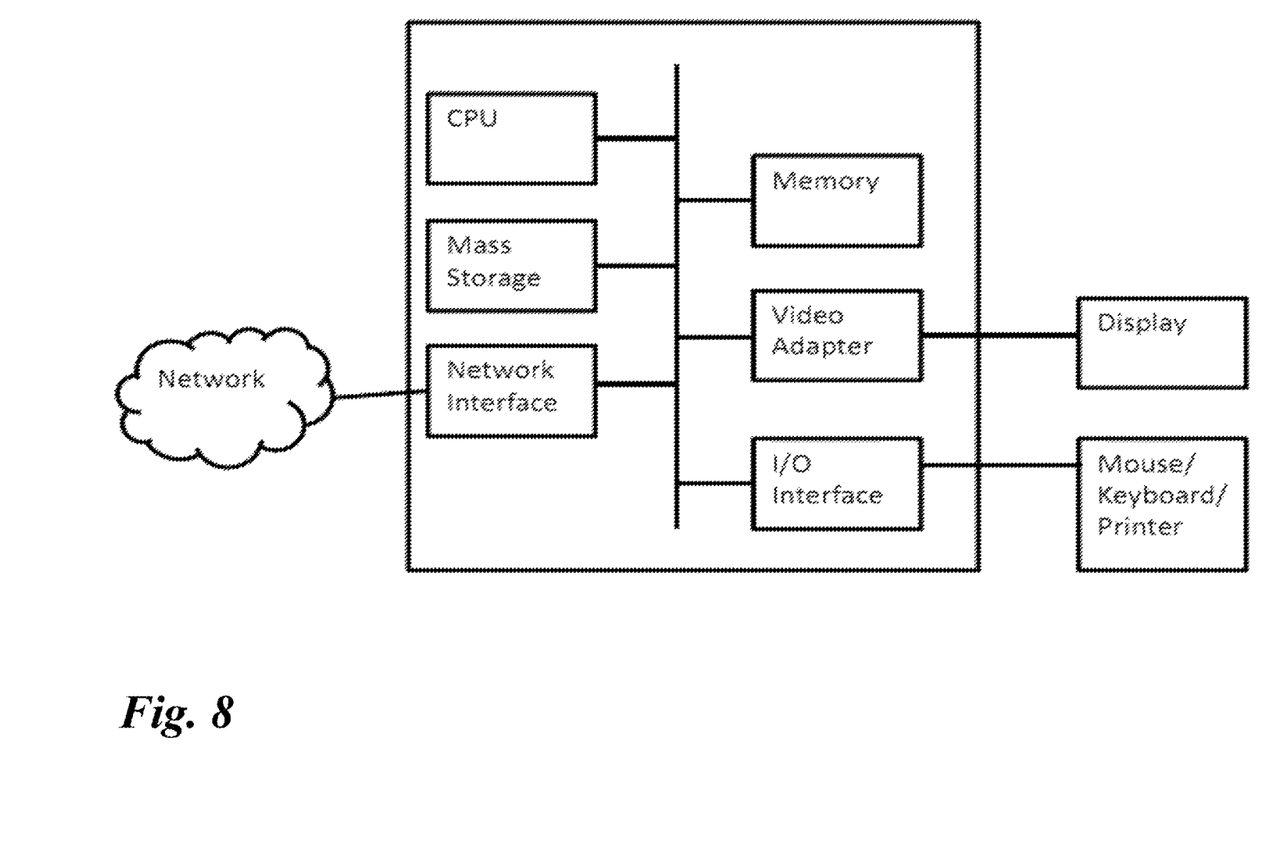
FIG. 8 illustrates a computing platform that may be used for implementing, for example, the devices and methods described herein, in accordance with an embodiment.

FIG. 8 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 9:
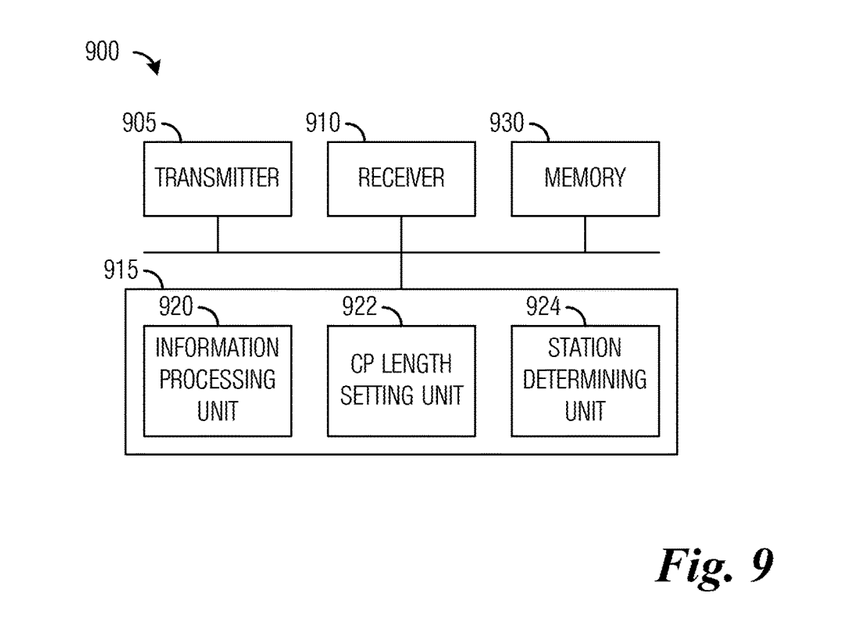
FIG. 9 illustrates an example first communications device in accordance with an embodiment.

FIG. 9 illustrates an example first communications device 900. Communications device 900 may be an implementation of a station. Communications device 900 may be used to implement various ones of the embodiments discussed herein. As shown in FIG. 9, a transmitter 905 is configured to transmit packets, and the like. Communications device 900 also includes a receiver 910 that is configured to receive packets, UL scheduling information, and the like.

An information processing unit 920 is configured to process UL scheduling information. Information processing unit 920 is configured to process an indicator of OFDMA and/or UL MU-MIMO usage. Information processing unit 920 is configured to process an indicator of CP length. CP length setting unit 922 is configured to set a CP length for a transmission. CP length setting unit 922 is configured to set the CP length in accordance with an indicator of OFDMA and/or UL MU-MIMO usage. CP length setting unit 922 is configured to set the CP value in accordance with an indicator of CP length. CP length setting unit 922 is configured to set the CP value in accordance with a number of stations receiving scheduling information in the UL scheduling information. Station determining unit 924 is configured to determine a number of stations receiving scheduling information in the UL scheduling information. A memory 930 is configured to store packets, UL scheduling information, resource allocations, indicators, CPs, CP lengths, and the like.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while information processing unit 920, CP length setting unit 922, and station determining unit 924 may be software modules executing in a microprocessor (such as processor 915) or a custom circuit or a custom compiled logic array of a field programmable logic array. Information processing unit 920, CP length setting unit 922, and station determining unit 924 may be modules stored in memory 930.

Figure 10:
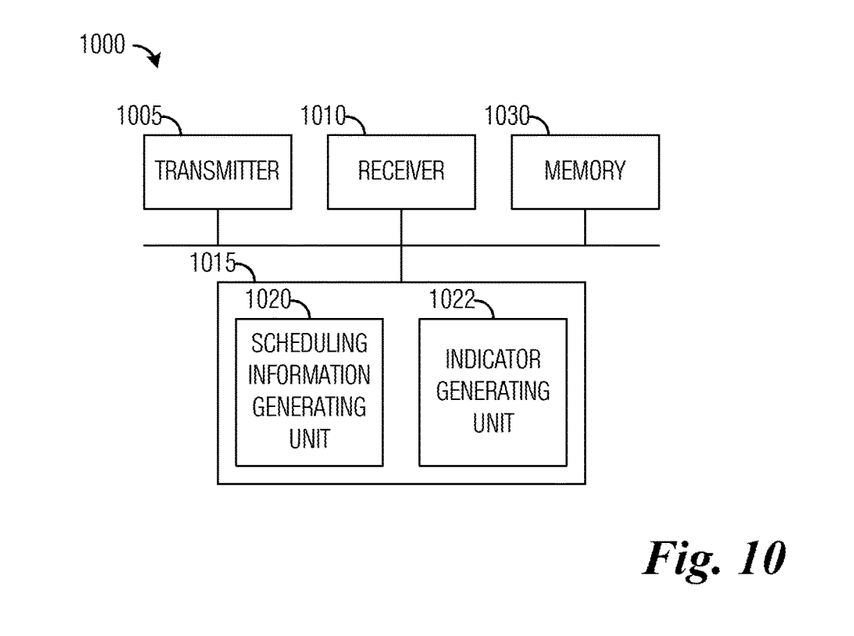
FIG. 10 illustrates an example second communications device in accordance with an embodiment.

FIG. 10 illustrates an example second communications device 1000. Communications device 1000 may be an implementation of an access point. Communications device 1000 may be used to implement various ones of the embodiments discussed herein. As shown in FIG. 10, a transmitter 1005 is configured to transmit packets, UL scheduling information, and the like. Communications device 1000 also includes a receiver 1010 that is configured to receive packets, UL transmissions, and the like.

A scheduling information generating unit 1020 is configured to generate resource allocations and scheduling information based on the resource allocations. An indicator generating unit 1022 is configured to generate an indicator of OFDMA and/or UL MU-MIMO usage or CP length for scheduled transmissions. A memory 1030 is configured to store packets, UL scheduling information, resource allocations, indicators, CPs, CP lengths, and the like.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while scheduling information generating unit 1020 and indicator generating unit 1022 may be software modules executing in a microprocessor (such as processor 1015) or a custom circuit or a custom compiled logic array of a field programmable logic array. Scheduling information generating unit 1020 and indicator generating unit 1022 may be modules stored in memory 1030.

Although the present disclosure and its advantages have been described in detail, it should be understood that various changes, substitutions and alterations can be made herein without departing from the spirit and scope of the disclosure as defined by the appended claims.

What is claimed is:

1. A method for communicating in a wireless communications system, the method comprising:
   receiving, by a station, scheduling information for an uplink transmission scheduled for the station, wherein the scheduling information comprises a usage indicator indicating at least one of a plurality of multiple access techniques, and wherein the usage indicator is received via a downlink transmission in accordance with a first length of a first cyclic prefix,
   setting, by the station, a second length of a second cyclic prefix for the uplink transmission in accordance with the usage indicator, wherein the second length is longer than the first length; and
   transmitting, by the station, the uplink transmission with the second cyclic prefix,
   wherein the plurality of multiple access techniques comprises orthogonal frequency division multiple access (OFDMA) and multi-user multiple input multiple output (MU-MIMO),
   wherein setting the second length of the second cyclic prefix comprises:
   setting the second length of the second cyclic prefix to a value,
   wherein the value corresponds to a first value if the usage indicator indicates that at least one of the plurality of multiple access techniques is to be used; or
   wherein the value corresponds to a second value if the usage indicator indicates that none of the plurality of multiple access techniques are to be used.

2. A method for communicating in a wireless communications system, the method comprising:
   receiving, by a station, scheduling information for an uplink transmission scheduled for the station, wherein the scheduling information is received via a downlink transmission in accordance with a first length of a first cyclic prefix;
   setting a second length of a second cyclic prefix to a first value in response to determining that the scheduling information includes information intended for more stations than just the station; or setting a second length of a second cyclic prefix to a second value in response to determining that the scheduling information includes information intended for only the station, wherein the second length is longer than the first length; and
   transmitting, by the station, the uplink transmission with the second cyclic prefix,
   wherein the plurality of multiple access techniques comprises orthogonal frequency division multiple access (OFDMA) and multi-user multiple input multiple output (MU-MIMO),
   wherein setting the second length of the second cyclic prefix comprises:
   setting the second length of the second cyclic prefix to a value,
   wherein the value corresponds to a first value if the usage indicator indicates that at least one of the plurality of multiple access techniques is to be used; or
   wherein the value corresponds to a second value if the usage indicator indicates that none of the plurality of multiple access techniques are to be used.

3. A station comprising:
   a receiver configured to receive scheduling information for an uplink transmission scheduled for the station, wherein the scheduling information comprises a usage indicator indicating at least one of a plurality of multiple access techniques, and wherein the usage indicator is received via a downlink transmission in accordance with a first length of a first cyclic prefix;
   a processor operatively coupled to the receiver, the processor configured to set a second length of a second cyclic prefix for the uplink transmission in accordance with the usage indicator, wherein the second length is longer than the first length; and
   a transmitter operatively coupled to the processor, the transmitter configured to transmit the uplink transmission with the second cyclic prefix,
   wherein the plurality of multiple access techniques comprises orthogonal frequency division multiple access (OFDMA) and multi-user multiple input multiple output (MU-MIMO),
   wherein the processor is configured to set the second length of the second cyclic prefix to a first value if the usage indicator indicates that at least one of the plurality of multiple access techniques is to be used, or the processor is configured to set the second length of the second cyclic prefix to a second value if the usage indicator indicates that none of the plurality of multiple access techniques are to be used, and wherein the first value is different from the second value.

4. A station comprising:
   a receiver configured to receive scheduling information for an uplink transmission scheduled for the station, wherein the scheduling information is received via a downlink transmission in accordance with a first length of a first cyclic prefix;
   a processor operatively coupled to the receiver,
   wherein the processor is configured to set a second length of a second cyclic prefix to a first value in response to determining that the scheduling information includes information intended for more stations than just the station, or the processor is configured to set a second length of a second cyclic prefix to a second value in response to determining that the scheduling information includes information intended for only the station, wherein the second length is longer than the first length; and
   a transmitter operatively coupled to the processor, the transmitter configured to transmit the uplink transmission with the second cyclic prefix, wherein the plurality of multiple access techniques comprises orthogonal frequency division multiple access (OFDMA) and multi-user multiple input multiple output (MU-MIMO), wherein the processor is configured to set the second length of the second cyclic prefix to a first value if the usage indicator indicates that at least one of the plurality of multiple access techniques is to be used, or the processor is configured to set the second length of the second cyclic prefix to a second value if the usage indicator indicates that none of the plurality of multiple access techniques are to be used, and wherein the first value is different from the second value.

\* \* \* \* \*